(12) United States Patent
Jerolm et al.

(10) Patent No.: US 11,868,302 B2
(45) Date of Patent: Jan. 9, 2024

(54) STATUS SIGNAL OUTPUT

(71) Applicant: WAGO VERWALTUNGSGESELLSCHAFT MBH, Minden (DE)

(72) Inventors: Daniel Jerolm, Bad Essen (DE); Hans-Herbert Kirste, Minden (DE); Frank Schadde, Luebbecke (DE); Gerald Huse, Loehne (DE)

(73) Assignee: WAGO Verwaltungsgesellschaft mbH, Minden (DE)

(*) Notice: Subject to any disclaimer, the term of this patent is extended or adjusted under 35 U.S.C. 154(b) by 0 days.

(21) Appl. No.: 17/955,086

(22) Filed: Sep. 28, 2022

(65) Prior Publication Data
US 2023/0026273 A1   Jan. 26, 2023

Related U.S. Application Data

(63) Continuation of application No. 16/693,779, filed on Nov. 25, 2019, now Pat. No. 11,537,549, which is a
(Continued)

(30) Foreign Application Priority Data

May 24, 2017   (DE) .................. 10 2017 208 836.2

(51) Int. Cl.
*G06F 13/42* (2006.01)
*G06F 13/374* (2006.01)
(Continued)

(52) U.S. Cl.
CPC ........ *G06F 13/4243* (2013.01); *G06F 13/374* (2013.01); *H04L 12/40019* (2013.01); *H04L 12/40032* (2013.01); *H04L 12/42* (2013.01)

(58) Field of Classification Search
CPC .............. G06F 13/4243; G06F 13/374; H04L 12/40019; H04L 12/40032; H04L 12/42; H04L 12/40169
See application file for complete search history.

(56) References Cited

U.S. PATENT DOCUMENTS 4,594,724 A   6/1986   Hogan
4,847,833 A   7/1989   Doering et al.
(Continued)

FOREIGN PATENT DOCUMENTS

CN   101702663 A   5/2010
CN   104348690 A   2/2015
(Continued)

OTHER PUBLICATIONS

Machine Translation of CN-107819969-A. (Year: 2023).*
(Continued)

*Primary Examiner* — Jean B Corrielus
(74) *Attorney, Agent, or Firm* — Muncy, Geissler, Olds & Lowe, P.C.

(57) ABSTRACT

A data bus subscriber connected to a local bus, particularly a ring bus. The data bus subscriber has a status signal input for receiving a first status signal value from a downstream data bus subscriber or a terminator, a status signal output for providing a second status signal value to an upstream data bus subscriber or to a local bus master, wherein the data bus subscriber is adapted to provide the second status signal value based on a logical link of a communication readiness of the data bus subscriber and the first status signal value. The invention further relates to a corresponding method and a local bus.

12 Claims, 4 Drawing Sheets

Related U.S. Application Data continuation of application No. PCT/EP2018/062962, filed on May 17, 2018.

(51) Int. Cl.
*H04L 12/40* (2006.01)
*H04L 12/42* (2006.01)

(56) References Cited

U.S. PATENT DOCUMENTS

| | | |
|---|---|---|
| 5,151,898 A | 9/1992 | Kondo |
| 5,472,347 A | 12/1995 | Nodenstrom et al. |
| 5,936,520 A | 8/1999 | Luitje et al. |
| 6,377,581 B1 * | 4/2002 | Anand ............... G06F 13/4243 370/402 |
| 6,421,710 B1 | 7/2002 | Jasperneite et al. |
| 6,466,539 B1 | 10/2002 | Kramer et al. |
| 7,933,663 B2 | 4/2011 | Teranisi et al. |
| 8,856,413 B2 | 10/2014 | Schultz |
| 9,237,092 B2 | 1/2016 | Chen et al. |
| 9,483,099 B2 | 11/2016 | Heiling et al. |
| 10,156,883 B2 | 12/2018 | Heiling et al. |
| 2009/0180483 A1 * | 7/2009 | Przybylski .......... H04L 12/4637 370/400 |
| 2011/0119507 A1 | 5/2011 | Reidt |
| 2011/0167188 A1 | 7/2011 | Hartwich et al. |
| 2017/0229159 A1 | 8/2017 | Huen et al. |
| 2018/0336960 A1 | 11/2018 | Chu et al. |

FOREIGN PATENT DOCUMENTS

| | | |
|---|---|---|
| CN | 105049551 A | 11/2015 |
| DE | 199 35 192 A1 | 2/2001 |
| DE | 10 2008 044 318 A1 | 8/2009 |
| EP | 0440982 A2 | 8/1991 |
| EP | 2 287 689 A1 | 2/2011 |
| JP | 2014-033371 A | 2/2014 |
| RU | 2009 127 860 A | 1/2011 |
| TW | 201702889 A | 1/2017 |
| WO | WO 2009/040298 A1 | 4/2009 |
| WO | WO 2016/051435 A1 | 4/2016 |

OTHER PUBLICATIONS

Machine Translation of DE-102004057410-A1 (Year: 2023).*
Machine Translation of WO-2006136201-A1 (Year: 2023).*
Chinese Office Action for Chinese Application No. 201880034548.4 dated May 26, 2021.

* cited by examiner

STATUS SIGNAL OUTPUT

This nonprovisional application is a continuation of U.S. application Ser. No. 16/693,779 filed on Nov. 25, 2019, now U.S. Pat. No. 11,537,549 issued on Dec. 27, 2022, which is a continuation of International Application No. PCT/EP2018/062962, which was filed on May 17, 2018, and which claims priority to German Patent Application No. 10 2017 208 836.2, which was filed in Germany on May 24, 2017, and which are all herein incorporated by reference.

BACKGROUND OF THE INVENTION

Field of the Invention

The present invention relates to a data bus subscriber for use on a local bus, in particular a data bus subscriber with a status signal output for checking the completeness and operability of the local bus.

Description of the Background Art

Data bus subscribers are mostly used in automation systems.

Automation systems are used in particular for the control of industrial installations, buildings and means of transport. For the control of an automation system, usually several sensors and actuators are necessary. These monitor and control the process performed by the installation. The different sensors and actuators of an automation system are often referred to as automation devices.

These automation devices can either be connected directly to a control unit of the automation system or can first be connected to input and output modules, which are often referred to as I/O modules. These can in turn be connected directly to the control unit. The automation devices can either be integrated directly in the I/O modules or can be connected to them via cable or wirelessly.

The control of an automation system is usually accomplished with the help of one or more programmable logic controllers, PLC. The PLCs can be arranged hierarchically or decentrally in an automation system. There are different performance levels for the PLCs, so that they can take over different types of controls and regulating techniques depending on the computing and storage capacity. In the simplest case, a PLC has inputs, outputs, an operating system (firmware) and an interface via which a user program can be loaded. The user program defines how the outputs are to be switched as a function of the inputs. The inputs and outputs can be connected to the automation devices and/or the I/O modules and the process carried out by the automation system can be monitored or controlled by the logic stored in the user program. In this case, the monitoring of the process is accomplished by the sensors and the control of the process by the actuators. The control unit can also be referred to as a central controller or central unit and assumes control of at least one automation device or I/O module connected to the control unit.

However, direct connection of the automation devices to the at least one control unit or of the I/O modules to the at least one control unit in the form of a parallel wiring, i.e., when one line is routed from each automation device or each I/O module to the higher-level control unit, is very expensive. Especially in an increasing degree of automation in automation systems, the cabling effort increases with parallel wiring. This is associated with great cost in the design, installation, commissioning and maintenance.

For this reason, automation systems generally use bus systems today, by means of which the automation devices or the I/O modules can be connected to the control unit. Such subscribers of a bus system are also referred to as bus subscribers. Because data is exchanged on the bus system, bus subscribers are also often referred to as data bus subscribers. In order to further simplify the connection of the individual automation devices or the I/O modules to the bus system, nowadays individual groups of automation devices or I/O modules are initially interconnected to a local bus system with the help of a specialized local bus, and then at least one subscriber of this local bus is connected to the bus system, which is connected to the control unit. In this case, the local bus system may differ from the bus system, which is used to establish the connection with the control unit.

The subscriber of a group of local bus subscribers connected to the bus system of the control unit is often referred to as a local bus master. Alternatively, the term header of the local bus system is also used. In comparison to other local bus subscribers, this local bus master may contain further logic, circuits or functionalities which are necessary for connection to the bus system of the control unit. Also, the local bus master itself may include a PLC. This subscriber can also have logic and circuits for conversion between the two bus systems. The local bus master can therefore also be designed as a gateway or bus converter, and it ensures conversion of the data provided in the format of one of the bus systems to the format of the local bus system and vice versa. In most cases, however, not mandatory, the local bus master is specialized in the connection of the local bus to the higher-level bus.

The local buses that are used are usually tailored to the specific operational requirements of the automation devices or I/O modules or take into account their special hardware design. The groups of automation devices or I/O modules of the local bus system usually form a subgroup of the automation system for performing a specific task in the process performed by the automation system. The data exchanged on the buses for the process is also often referred to as local bus data or process data, because this data includes information for regulating or controlling the process executed by the automation system. This process data may include, among other things, measurement data, control data, status data and/or other information. Depending on the bus protocol used, this process data can precede (header) or be appended to (tail) other data. This other data may include information regarding the process data or include information with respect to internal communication on the local bus. Here, a variety of different information is known, which can precede or be added to the process data according to the bus protocol used.

A ring bus is a specialized form of a local bus, as known for example from U.S. Pat. No. 5,472,347 A. In a ring bus, the data bus subscribers, for example the automation devices or I/O modules, are each connected to the data bus subscribers directly adjacent to them and data is forwarded in succession from one to the other data bus subscriber. Thus, not all data bus subscribers are sent the data at the same time, but in succession, wherein a data bus subscriber receives data from its upstream data bus subscriber and forwards data to his downstream data bus subscriber. Between receiving the data and forwarding, the data bus subscriber can process the received data. When the data has reached the last data bus subscriber in the series, the data from the last data bus subscriber is returned back successively to the first data bus subscriber. The return can be performed either through all data bus subscribers or past them by means of a bypass line.

The ring bus thus has a downflow and an upward flow of data. The data in a ring bus is often not transferred in the form of addressed data packets, but instead in the form of cycle frames that pass through all data bus subscribers. Cycle frames are a cyclically repeating sequence of telegrams/data packets. Several telegrams/data packets can be present in a cycle frame. Cycle frames are sent cyclically, for example, at a fixed time interval from the local bus master to the data bus subscribers. These cycle frames usually contain a header, an information part and a checksum part. The information part can thereby carry the telegrams/data packets which themselves can carry process data and this part can accordingly also be referred to as a process data part. In this process data part, the process data are arranged such that due to the position of the process data within the process data part in the cycle frame, for example within an associated contiguous data block, the data bus subscribers can recognize those process data that are addressed to the data bus subscriber. Process data addressed to the data bus subscriber are those process data which are suitable for a data bus subscriber to control, regulate or perform an evaluation, in particular to collect measurement data and to set output values at outputs of said data bus subscriber.

In a ring bus, the cycle frame is routed from one data bus subscriber to the other. At any given time, a data bus subscriber always receives only part of the cycle frame from its upstream data bus subscriber. When the data contained in this part has been processed by the data bus subscriber, the part is forwarded to the downstream data bus subscriber and at the same time, a new part of the cycle frame is received by the upstream data bus subscriber. In this way, all parts of the cycle frame sequentially pass through all the data bus subscribers.

In modern bus systems, it is possible that data bus subscribers can be added to the bus or can be removed from this, even during the actual operation of the bus. For the correct functioning of the bus, it is necessary that the unit controlling or driving the bus, i.e., the local bus master or the PLC, is informed at all times that the bus system is complete and that all data bus subscribers are ready to communicate.

For this purpose, a status signal is routed through all data bus subscribers arranged on the bus, so that, for example, a logical one (high state) or a logical zero (low state) indicates the completeness and/or communication readiness of all data bus subscribers arranged on the bus.

However, the known bus systems and the data bus subscribers connected thereto usually have the disadvantage that the status signal is automatically set to a specific defined state immediately when the data bus subscriber is added. However, this can lead to invalid states because, for example, the state is already being changed without a corresponding condition having occurred. In this case, therefore, the local bus master or the PLC have no way of ascertaining from the state change alone whether the corresponding condition has already occurred, for example whether the added data bus subscriber is already ready to communicate.

SUMMARY OF THE INVENTION

It is therefore an object of the present invention to avoid invalid state messages.

This object is achieved with a data bus subscriber, a method for operating a data bus subscriber and a local bus according to an exemplary embodiment.

The data bus subscriber according to an exemplary embodiment of the invention is connected to a local bus, in particular a ring bus, and has a status signal input for receiving a status signal from a downstream data bus subscriber or a termination unit. The status signal has a first status signal value. In accordance with its reception at the status signal input, this first status signal value may also be called input status signal value, input status value, or input value. The status signal value can originate from a downstream data bus subscriber, that is to say a data bus subscriber which directly or indirectly physically follows the data bus subscriber on the local bus. A data bus subscriber is said to be downstream, for example, when it is arranged at a position on the local bus which follows the position of the data bus subscriber. Alternatively, the first status signal value may also originate from a termination unit. A termination unit is connected to the last data bus subscriber in the local bus and provides a certain status signal value at a status signal output of the termination unit. Regardless of whether the status signal value is provided from a downstream data bus subscriber or a termination unit, this status signal value can be referred to as an output signal status value, output status value, or output value, because it is present at the status signal output of the termination unit or at the data bus subscriber. The status signal value may assume a discrete status signal value, for example, this status signal value may assume a high state (logical one) or a low state (logical zero).

The data bus subscriber also can have a status signal output for providing a status signal to an upstream data bus subscriber or to a local bus master. The status signal may have a second status signal value. In accordance with the output at the status signal output, this second status signal value may also be referred to as an output status signal value, output status value, or output value. The upstream data bus subscriber can be a data bus subscriber that physically or indirectly precedes the transmitting data bus subscriber in the local bus, or can be the local bus master, which represents the first data bus subscriber in the local bus.

A data bus subscriber or the local bus master can be upstream, for example, when it is arranged at a position on the local bus which precedes the position of the data bus subscriber. The data bus subscriber can be adapted to provide the second status signal value of the provided status signal based on a logical link of a communication readiness of the data bus subscriber and the first status signal. If, for example, a status signal which has a first status signal value indicating that the downstream data bus subscriber is ready to communicate is present at the status signal input of the data bus subscriber, the data bus subscriber can output this first status signal value at its status signal output as the second output status signal value as soon as the data bus subscriber itself is ready to communicate. In this case, therefore, the first and second status signal value correspond. If the first status signal value at the status signal input indicates that the downstream data bus subscriber is not yet ready to communicate, the second status signal value cannot be changed to the first status signal value even if the received data bus subscriber is ready to communicate until the first status signal value also indicates that the downstream data bus subscriber is ready to communicate. The first and the second status signal values may assume discrete states, and a specific defined discrete state may indicate that a data bus subscriber is ready to communicate. This means that if the status signal value received via the status signal input can be considered a logical state, that is, a logical one or a logical zero, and the communication readiness can also be expressed as a logical one or logical zero, then only a corresponding status signal value is provided at the status signal output of the data bus subscriber, provided the logical states correspond. That is, only if the first status signal value indicates that the downstream data bus subscriber is ready to communicate and the data bus subscriber itself is ready to communicate is the second status signal value changed to the first status signal value. The behavior can be created with an AND link. The communication readiness can be displayed with a logical one and the first status signal value can be negated, so that if both are at a logical one state, the AND link also indicates a logical one state. This link value is then negated again and output as the second status signal value. Accordingly, the logical link can be arranged such that the first status signal value and the second status signal value assume a same discrete state when the data bus subscriber is ready to communicate. In this case, the logical link can be set up to set the first status signal value to a fixed state if the data bus subscriber is not yet ready to communicate, or to otherwise change the state. In other words, it can also be said that the second status signal value, which is specified by the termination unit, and which indicates the communication readiness, is looped from the termination unit to the local bus master through the local bus, depending on the communication readiness of the respective data bus subscribers. It can also be said that there is a status signal line between the termination unit and the local bus master, wherein this status signal line is only complete or assumes the status signal value indicating communication readiness when all the data bus subscribers are ready to communicate. Until all data bus subscribers are ready for communication, another state can be present at the signal line on the local bus master. It can also be said that the status signal line between the termination unit and the local bus master is switched in sections to one status signal value, which indicates the communication readiness of the individual data bus subscribers. In this case, this status signal value corresponds to the one which is specified by the termination unit. But it can also be that no termination unit is connected to the last data bus subscriber and that the last data bus subscriber assumes the functionality of the termination unit. For example, the last data bus subscriber who determines that no termination unit is connected, because for example no connection to the status signal input was made, can output a corresponding first status signal value at its status signal output even if no second status signal value is present at the status signal input. In this case, it is only necessary to ensure that the data bus subscriber is aware that itself is the last data bus subscriber, and that the absence of the first status signal value is based on the position of the data bus subscriber and not on an error of the downstream data bus subscriber. In a further alternative, it is also conceivable that the last data bus subscriber has no status signal input, but only a status signal output. This particular data bus subscriber is thus always the last data bus subscriber in a local bus.

With the data bus subscriber according to the invention and the conditional change of a status signal value on a status signal line, invalid information about the state is avoided because the status signal value applied to the local bus master is only changed to a value which indicates the communication readiness of the data bus subscribers when all the data bus subscribers are ready to communicate.

The first and second status signal values can assume the same discrete state when the data bus subscriber and the downstream data bus subscriber are ready to communicate. It may also be said that the status signal at the status signal input and status signal output of the data bus subscriber assumes the same status signal value when the data bus subscriber and the downstream data bus subscribers are ready to communicate. That is to say, the status signal value at the status signal input of a data bus subscriber indicates whether the downstream data bus subscriber or the downstream data bus subscribers are ready to communicate, whereas the status signal value at the status signal output of the data bus subscriber indicates whether the data bus subscriber is also ready to communicate. If the first and the second status signal value assume the same value, then not only is the data bus subscriber ready to communicate but also, inevitably, the downstream data bus subscribers. The logical link of the first status signal value (SSW1) at the status signal input with the communication readiness (KB) of the data bus subscriber to generate the second status signal value (SSW2) at the status signal output is summarized in Table 1, wherein "T" stands for "true" and "F" stands for "false". These values are therefore Boolean values that can only assume two states. Instead of true and false, the logical states high and low or one and zero can also be used, which can be linked via logical operators of the Boolean algebra according to Table 1.

TABLE 1

Logical link of the first status siqnal value and the communication readiness

| $SSW_1$ | KB | $SSW_2$ |
|---------|----|---------|
| F | F | F |
| F | T | F |
| T | F | F |
| T | T | T |

Thus, a conditional status signal line is established which, when completeness has been achieved, indicates that all the data bus subscribers are ready to communicate, because all of the data bus subscribers of the local bus have the same value present at the status signal input as at the status signal output; as shown in Table 1, all status signal outputs then have the same logical value. If there is an interruption, then the status signal value on a data bus subscriber changes at its status signal input, causing a change in the status signal output. This means that all data bus subscribers located downstream of the interruption will change their status signal values so that it can be determined that the local bus is no longer without interruption.

The status signal input and the status signal output can be physically separated from other interfaces of the data bus subscriber. In this case, the status signal line defined via the status signal inputs and status signal outputs forms a line between the termination unit or the last data bus subscriber and local bus master, which is separate from the local bus and is not part of the local bus. That is to say, the status signal value is not sent via the local bus. The local bus remains accordingly free of this information and can be used in advance to transport data to data bus subscribers that are already ready to communicate.

The data bus subscriber is ready to communicate as soon as the data bus subscriber is clock-synchronized to the local bus. Alternatively, or additionally, it may also be a condition that a processing unit of the data bus subscriber can process data received via the local bus. In this case, the data can be received, for example, in a telegram/data packet of a cycle frame. The cycle frame passes through the data bus subscribers unit-by-unit, piecemeal, or in parts, for example, in parts or symbols of 8 bits. That is, at any given time, a data bus subscriber will only ever have a part of the cycle frame. After a predetermined time, the part of the cycle frame available to the data bus subscriber is forwarded to the downstream data bus subscriber and another part of the cycle frame is received by the upstream data bus subscriber. For this purpose, the data bus subscribers must have uniform timing or clocking to which they are synchronized so that the receiving and forwarding of the portions of the cycle frame always happens at the same time. That is, only when the data bus subscribers are clock-synchronized are they also ready to communicate. The clock synchronicity of the data bus subscribers can be displayed by setting a register value/a flag. In addition, it may still be necessary for the display of communication readiness that the data bus subscribers cannot only receive and forward parts of the cycle frame, but that they are also capable of processing the parts of the cycle frame. This means that the processing unit located in the data bus subscriber is initialized and can process the parts of the cycle frame. For example, if the data bus subscriber detects a first bit pattern transmitted only once in a cycle frame or telegram/data packet, which signals the start of the cycle frame or a telegram/data packet in a cycle frame or recognizes other signaled data, then the processing unit can be ready to process data from the telegram/data packet or the cycle frame and accordingly, communication readiness can be signaled. In this case, the processing unit may be an arithmetic logic unit, an arithmetic circuit, a microcontroller, or another digital logic circuit, which is formed as a part of a semiconductor chip and is implemented in an integrated circuit (ASIC), or in a field programmable (logic) gate array (FPGA), or in another programmable circuit (PLD), or in a discrete gate or transistor logic. If the processing unit is not yet initialized, that is, if it is not yet able to carry out processing, the data can be guided past the processing unit, for example, by means of a switchable bypass line. If the processing unit is able to process the data, i.e., to process the received parts of the cycle frame, then the part of the telegram/data packet can be routed through the processing unit, i.e., in this case, the bypass line is no longer needed. The data bus subscriber can have at least one switch which switches over in a controlled manner between the bypass line and the processing unit as soon as the processing unit is able to process parts of the cycle frame. This switch may be an electronic switch that can be switched by a signal output from the processing unit itself and that switches between the bypass line and the processing unit. As soon as the processing unit is ready to process data, the data bus subscriber is ready to communicate. The data bus subscriber in this case may be able to change the second status signal value as a function of the first status signal value.

The data bus subscriber can comprise a controller for changing a resistance value at the status signal output, wherein a change of the resistance value causes a change of the status signal value, or a transfer of the second status signal value to the upstream data bus subscriber is only possible by the change in the resistance value. The status signal input of a data bus subscriber thereby represents a first resistance value, for example via a pull-up resistor which keeps the status signal input at a certain voltage level. Only when the resistance at the status signal output of the downstream data bus subscriber changes does the status signal input take on the status signal value of the downstream data bus subscriber. As a result, a targeted status signal value transfer is possible without there being any periods in which indeterminate status messages exist because at any given time, a state for the status signal input is defined. Only when all status signal outputs have been changed to corresponding resistance values for forwarding the status signal values does the local bus master receive the status signal and can determine that the local bus is complete and that all data bus subscribers connected to the local bus are ready for communication. This means that only when all data bus subscribers in the local bus have changed their resistance values of the status signal outputs is the status signal present from the last data bus subscriber or the termination unit up to the local bus master. If an error occurs in a data bus subscriber, the status signal is no longer present from the last data bus subscriber or the termination unit to the local bus master. In this case, there is an interruption of the status signal line. Even if the data bus subscribers downstream of the interrupting data bus subscriber pass the status signal or set all their status signal outputs to a predefined status, and the status signal outputs assume resistance values which allow for the status signal to pass through, the status signal is stopped at the interrupting data bus subscriber. Namely, this interrupting data bus subscriber does not set its status signal output to a predetermined state and the status signal output does not assume a specific resistance value, so that the upstream data bus subscriber cannot receive the status signal and therefore does not change its own status signal output. That is, starting from the interrupting data bus subscriber, the status signal outputs are not changed with respect to the provided state and the resistance value. This makes it easy to check whether a local bus is complete and whether the data bus subscribers are all ready to communicate.

The controller can be adapted to change the resistance value of the status signal output from a first value to a second value. For example, no status signal is transmitted at the first value and the status signal is transmitted at the second value. In this case, the amount of change in the value of the resistance of the status signal output is dependent on the value of the resistance of the status signal input of the upstream data bus subscriber. For example, the first value is greater than the resistance value of the status signal input of the upstream data bus subscriber and the second value is less than the resistance value of the status signal input of the upstream data bus subscriber, so that the status signal can be transmitted.

The data bus subscriber can have a pull-up resistor at the status signal input. This ensures that the status signal input is kept at a certain state, for example a logical one, if no status signal output of a downstream data bus subscriber is connected. Only when a downstream data bus subscriber is connected and the resistance value of the status signal output of the downstream data bus subscriber is changed in comparison to the pull-up resistor does the status of the status signal input change, namely to the one of the status signal output of the downstream data bus subscriber. The data bus subscriber can correspondingly change the resistance of its status signal output if the data bus subscriber is ready to communicate and the downstream data bus subscriber is also ready to communicate. In the upstream data bus subscriber, the change in the value of the status signal output then causes the pull-up resistor to not indicate the logical state generated by the pull-up resistor at the status signal input, but instead show the status of the data bus subscriber status output, and so on. For example, the pull-up resistor at the status signal input of the data bus subscriber may be configured to maintain the state of the status signal input at a logical one as long as the status signal output of the downstream data bus subscriber is high impedance as compared to the pull-up resistor. High impedance can also mean that no data bus subscriber is connected. Only when a data bus subscriber is connected, and the latter changes the resistance value of the status signal output with the aid of the controller to a value which is smaller than the pull-up resistor, does the state of the status signal input of the data bus subscriber change. In this case, the local bus master can conclude from a state change at its status signal input that the local bus is complete and/or that all data bus subscribers are ready to communicate. The person skilled in the art is aware that the data bus subscriber can also have a pull-down resistor instead of the pull-up resistor and that the logic discussed above in this case thus negates, i.e. reverses.

The controller can be configured in the data bus subscriber independently of a processing unit. The change in the resistance value of the status signal output can thus be done independently of the status of a processing unit present in the data bus subscriber. The controller may for example be designed to monitor the processing unit and when the controller determines the readiness of the processing unit, the controller may change the resistance value of the status signal output accordingly to signal that the data bus subscriber is ready to communicate.

The controller can be embodied as part of a processing unit arranged in the data bus subscriber. The change in the resistance value of the status signal output is thus dependent on the operational readiness of the processing unit itself.

The data bus subscriber can be adapted to be arranged on the local bus during the operation of the local bus. For this purpose, the status signal output can be connected to a status signal input of an upstream data bus subscriber and the status signal input can be connected to a status signal output of the downstream data bus subscriber. Only when the newly added data bus subscriber is ready to communicate can the controller in the data bus subscriber change the resistance value at the status signal output so as to provide the status signal present at its status signal input—provided that the downstream data bus subscribers are already ready to communicate and a status signal is present at the status signal input—to the status signal output and forward it to the status signal input of the upstream data bus subscriber.

The object of the invention is also achieved by a method for operating a data bus subscriber connected to a local bus, in particular a ring bus. In this case, the method according to the invention comprises receiving a first status signal value from a downstream data bus subscriber or from a termination unit at the data bus subscriber, providing a second status signal value to an upstream data bus subscriber or a local bus master by the data bus subscriber, wherein the providing includes logical linkage of communication readiness of the data bus subscriber and of the first status signal value for providing the second status signal value.

The object of the invention is also achieved by a local bus, wherein the local bus has at least one data bus subscriber with a status signal input and a status signal output. According to the invention, the local bus furthermore has a termination unit which has at least one status signal output. The status signal output of the termination unit and the status signal input of the data bus subscriber are connected, and the termination unit is adapted to provide at its status signal output a first status signal value which is received at the status signal input of the data bus subscriber. The data bus subscriber is adapted to provide a second status signal value at the status signal output based on the communication readiness of the data bus subscriber itself and the first status signal value received at the status signal input of the data bus subscriber indicating the communication readiness of the downstream data bus subscribers. The termination unit mentioned here can also be a further data bus subscriber, which is arranged as the last data bus subscriber in the local bus and which assumes the functionality of the termination unit. This means that the last data bus subscriber provides a status signal value at its status signal output which indicates that the data bus subscriber is ready to communicate, even if no status signal value is present at the status signal input of the last data bus subscriber.

The local bus can have a local bus master which has a status signal input which is adapted to receive the second status signal value provided at the status signal output of the at least one data bus subscriber. The local bus master is able to determine the completeness of the local bus when the status signal value changes. In this case, the local bus master is aware that the data bus subscribers connected to the local bus are all ready to communicate. In order for the local bus master to know the identity of the data bus subscribers connected to the local bus, the latter can also send one or more telegrams/data packets in a cycle frame to the data bus subscribers after the status signal value has been changed, but also prior thereto, in order to identify the data bus subscribers. The local bus master can be set up to count a number of communication-ready data bus subscribers and to send a telegram/data packet to retrieve information for each counted data bus subscriber that is ready to communicate. In this case, the local bus master can be adapted to send a single telegram/data packet to all data bus subscribers for counting the communication-ready data bus subscribers in an order, i.e., the local bus master first transmits a single telegram/data packet to the local bus. Upon receipt of the individual telegram/data packet, each data bus subscriber already ready to communicate can change the counter contained in the telegram/data packet, for example, increment or decrement the latter before the telegram/data packet or parts of the telegram/data packet are sent to the next data bus subscriber. Data bus subscribers not yet ready to communicate only forward the telegram/data packet without changing the first counter. The last data bus subscriber returns the telegram/data packet to the local bus master. Based on the value of the counter, the local bus master then knows how many data bus subscribers of the local bus are already ready to communicate. The local bus master can be set up to repeat the transmission of the individual telegram/data packet for counting the communication-ready data bus subscribers as long as a status of the second status signal value at the status signal input of the local bus master does not correspond to the status of the first status signal value at the status signal output of the termination unit. To retrieve information from the data bus subscribers, the local bus master can generate a number of telegrams/data packets. In this case, the number of telegrams/data packets corresponds to the number of communication-ready data bus subscribers displayed by the first counter. For example, if the first counter has indicated that there are N data bus subscribers ready for communication, N telegrams/data packets are also generated and sent on the local bus, wherein N is an integer natural number. Subsequently, the number of telegrams/data packets is sent from the local bus master to the local bus. In each case one of the generated telegrams/data packets is intended for a communication-ready data bus subscriber and is assigned to the latter based on the respective relative position of the communication-ready data bus subscriber within the order. With this number of telegrams/data packets, it is then possible accordingly to retrieve information from the data bus subscribers, wherein each telegram/data packet is assigned to exactly one communication-ready data bus subscriber, who upon recognizing that the telegram/data packet is addressed to the data bus subscriber, fills the latter with information which can be read by the local bus master after passing through the local bus.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
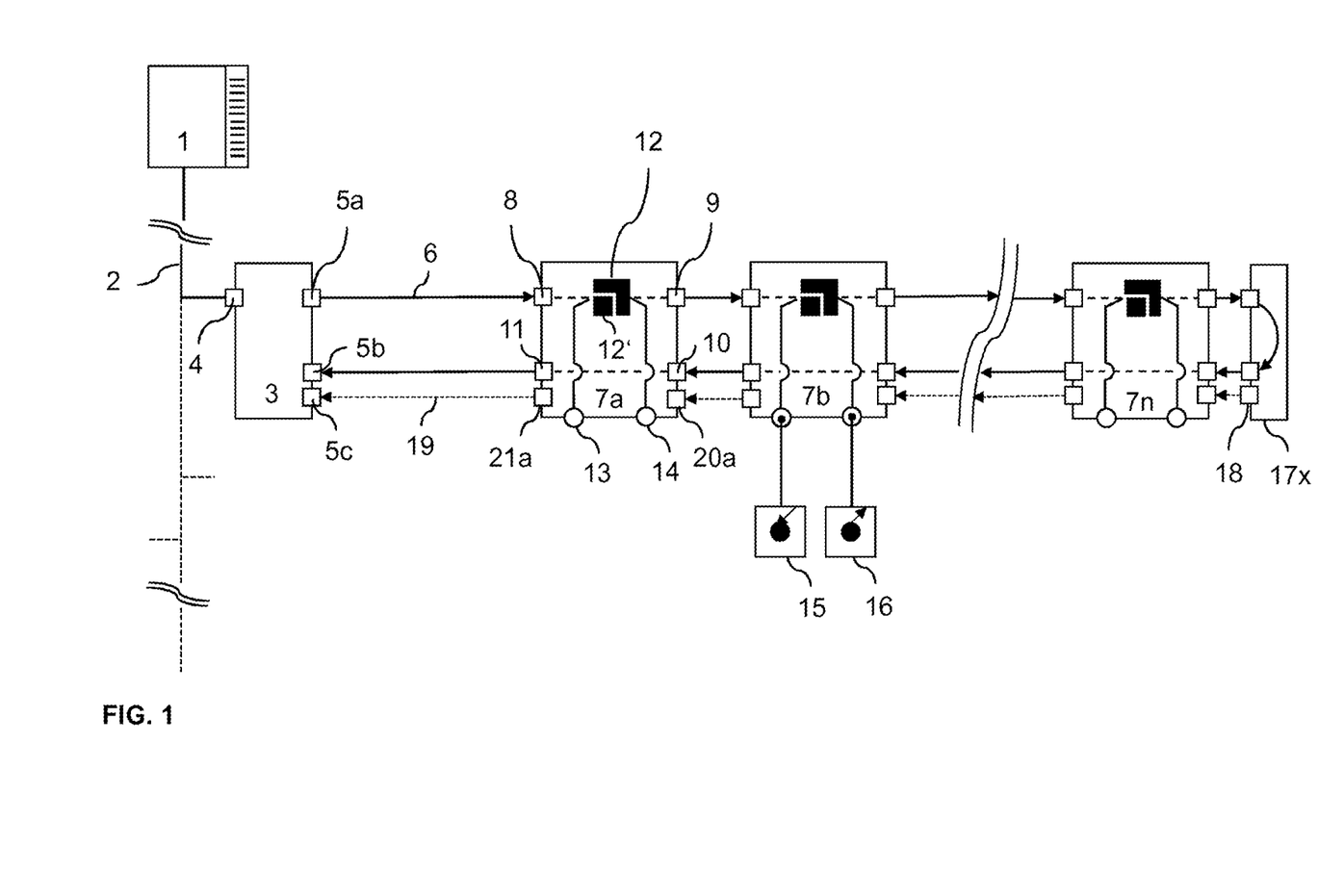
FIG. 1 is a schematic block diagram of an exemplary automation system with a programmable logic controller, a higher-level bus, and a plurality of exemplary data bus subscribers of the invention.

FIG. 1 shows a schematic block diagram of an automation system. It will be understood by the person skilled in the art that the automation system shown is only an example and all the elements, modules, components, subscribers and units belonging to the automation system can be configured differently but can nevertheless fulfill the basic functions described herein.

The automation system shown in FIG. 1 has a higher-level control 1, which can be realized for example with a programmable logic control unit, PLC. Such a PLC 1 basically serves to control and regulate the process performed by the automation system. However, PLCs 1 in automation systems today also take on more advanced functions, such as visualization, alerts and recording of all data relating to the process, and as such, the PLC 1 functions as a human-machine interface. There are PLCs 1 with different performance levels, which have different resources (computing capacity, memory capacity, number and type of inputs and outputs, and interfaces) that enable the PLC 1 to control and regulate the process of the automation system. A PLC 1 usually has a modular design and is formed of individual components, each fulfilling a different task. Typically, a PLC 1 includes a central processing unit (with one or more main processors and memory modules) and multiple modules with inputs and outputs. Such modular PLCs 1 can be easily expanded by adding modules. It depends on the complexity of the process and the complexity of the structure of the automation system as to which modules must be integrated in the PLC 1. In todays automation systems, the PLC 1 is also usually no longer an independent system, but instead the PLC 1 is connected via appropriate interfaces to the Internet or intranet. This means that the PLC 1 is part of a network through which or from which the PLC 1 can obtain information, instructions, programming, etc. For example, through a connection to a computer located on the intranet or the Internet, the PLC 1 can obtain information about the materials supplied to the process, so that the process can be optimally controlled, for example, by knowing its number or nature. It is also conceivable that the PLC 1 is controlled by a user via access from the intranet or Internet. Thus, for example, a user can access the PLC 1 with the aid of a computer, also called a host computer, and can check, change or correct its user programming. Accordingly, access to the PLC 1 is possible from one or more remote control stations or control centers. If necessary, the host computers can have visualization devices for displaying process sequences.

To control the process of the automation system, the PLC 1 is connected to automation devices. In order to keep the wiring costs low, bus systems are used for these connections. In the exemplary embodiment shown in FIG. 1, the PLC 1 is connected to a local bus master 3 of a subordinate local bus system by means of a higher-level bus 2, which in the exemplary embodiment shown here can be a field bus. However, not only a local bus master 3 of a local bus can be connected to the higher-level bus 2 as in the embodiment shown here, but also any other subscribers which are designed for communication with the PLC 1.

In the exemplary embodiment shown here, the higher-level bus 2 is connected to the local bus master 3. For this purpose, the local bus master 3 has a first interface 4, which is designed such that it can be connected to the higher-level bus 2. For this purpose, the interface 4 can have, for example, a receptacle in the form of a socket and the higher-level bus 2 can have a plug which can be received by the socket. In this case, the plug and the socket, for example, can be a modular plug and a modular socket, i.e., each core of the higher-level bus 2 is electrically or optically connected to a connection in the modular socket. However, the person skilled in the art also knows other ways in which an interface 4 can be designed so that the local bus master 3 can be electrically or optically connected to the higher-level bus 2. The person skilled in the art is familiar with screw, turn, click or plug connections, by means of which an electrical or optical connection can be made. In most cases, a male plug is received by a female counterpart. This receptacle usually does not only establish the electrical or optical connection, but also ensures that the two parts are mechanically coupled and can only be decoupled again with the application of a certain force. But it is also conceivable that the higher-level bus 2 is hardwired to the interface 4.

The local bus master 3 in the embodiment shown here has a further second interface to connect the local bus master 3 with the local bus, wherein the local bus is designed as a ring bus 6 in the exemplary embodiment shown here. In this case, the second interface is divided into a first part 5a and a second part 5b. The first part 5a of the second interface establishes the downlink in the ring bus 6 and the second part 5b of the second interface establishes the uplink in the ring bus 6.

In the embodiment shown here, the ring bus 6, the data transmission direction of which is shown with arrows in the exemplary embodiment shown in FIG. 1, includes the data bus subscribers 7a, 7b, . . . , 7n. In the exemplary embodiment shown here, these data bus subscribers 7a, 7b, . . . , 7n each have an interface 8 in order to receive data from an upstream or preceding data bus subscriber 7a, 7b, . . . , 7n. In the case of data bus subscriber 7a, the latter receives data from the upstream local bus master 3 via the interface 8. The data on the local bus 6 can also be referred to as local bus data. Further, in the embodiment shown here, the data bus subscribers 7a, 7b, . . . 7n each have an interface 9 to forward data to a downstream or subsequent data bus subscriber 7a, 7b, . . . , 7n. In the case of data bus subscriber 7a, the latter sends data to the downstream data bus subscriber 7b via the interface 9. The interfaces 8 and 9 serve to propagate data in the downlink direction of the ring bus 6, i.e., away from the local bus master 3. Further, the data bus subscribers 7a, 7b, . . . , 7n in this embodiment comprise interfaces 10 and 11 for propagating data in the uplink direction of the ring bus 6, i.e., to the local bus master 3, In the case of the data bus subscriber 7a, interface 10 is designed to receive data from the downstream or subsequent data bus subscriber 7b, and interface 11 is designed to forward data to the upstream or preceding data bus subscriber, here the local bus master 3. It can therefore also be said that the interfaces 9 and 11 are transmitter interfaces, whereas the interfaces 8 and 10 are receiver interfaces.

In the embodiment shown here, the connections of the interfaces and of the PLC 1 or the data bus participants 7a, 7b, . . . , 7n are realized by means of cables or printed circuit boards for direct or indirect contacting by electrical contacts. Another alternative is that the individual connections are made wirelessly, and the interfaces provide the necessary conversions to the radio communication standards used.

Even if the local bus master 3 and the individual data bus subscribers 7a, 7b, . . . , 7n in the embodiment shown here are shown spaced from each other, i.e., the local bus master 3 is arranged decentrally from the data bus subscribers 7a, 7b, . . . , 7n, the person skilled in the art is aware that the data bus subscribers 7a, 7b, . . . , 7n and the local bus master 3—which also represents a data bus subscriber of the ring bus 6—can also be connected directly to one another. In this case, for example, contacts of the one data bus subscriber can engage in corresponding receptacles or receptacle contacts of a directly adjacent data bus subscriber so as to establish an electrical connection between the data bus subscribers such that data can be transmitted in the downlink and uplink direction. For example, the data bus subscribers 7a, 7b, . . . , 7n may have receptacles at the side facing away from the master, and contacts on the side facing the master. If the data bus subscribers 7a, 7b, . . . , 7n are then lined up correspondingly, the contacts of the one data bus subscriber 7a, 7b, . . . , 7n each engage in the receptacles of the other data bus subscriber 7a, 7b, 7n and an electrical connection can be created. The local bus master 3 then has corresponding contacts on the side, which engage in the receptacles of the first data bus subscriber 7a so as to produce an electrical connection between the interfaces 5a and 8 or the interfaces 5b and 11. The person skilled in the art is also aware of other ways, e.g., pressure contacts, knife/fork contacts, of how two, directly adjoining data bus subscribers 7a, 7b, . . . , 7n can establish an electrical or optical connection.

In the case that the data bus subscribers 7a, 7b, . . . , 7n and the local bus master 3 are to be connected directly to one another, they can also have mechanical receptacles or mechanical fastener by means of which the individual data bus subscribers 7a, 7b, . . . , 7n and the local bus master 3 can be connected to each other. Here, for example, a data bus subscriber 7a, 7b, . . . , 7n can comprise a projection on one side and an undercut on the other. If the data bus subscribers 7a, 7b, . . . , 7n are then lined up, a projection engages in an undercut of the other data bus subscriber 7a, 7b, . . . , 7n, such that a mechanical coupling is produced. For the simple juxtaposition of the data bus subscribers 7a, 7b, . . . , 7n, these can also be arranged on a common receptacle, for example a DIN rail. For fastening on the DIN rail, the data bus subscribers 7a, 7b, . . . , 7n can have a corresponding fastener. Alternatively, or additionally, the data bus subscribers 7a, 7b, . . . , 7n can also have, for example, releasably connectable fastener by means of which the data bus subscribers 7a, 7b, . . . , 7n can be secured to either the rail or another receptacle. For this purpose, the releasably connectable fastener can be interchangeable and a corresponding fastener for the desired receptacle can be connected to the data bus subscribers 7a, 7b, . . . , 7n, such that these can be attached to the desired receptacle.

Further, the data bus subscribers 7a, 7b, . . . , 7n in in the embodiment shown in FIG. 1 also comprise a processing unit 12. This processing unit 12 can be an arithmetic logic unit or another type of arithmetic unit with which data can be processed. The processing unit 12 is preferably an integral part of the data bus subscriber 7a, 7b, . . . , 7n in order to ensure a particularly fast and time-synchronized processing of the data.

The processing unit 12 may also be referred to as the whole circuit of the data bus subscriber. This means, the processing unit 12 receives data via the inputs 8 and 10 and outputs data at the outputs 9 and 11. In addition, the processing unit 12 can receive or output data from/to the input/outputs 13 and 14, respectively. Furthermore, the processing unit 12 has access to a memory of the data bus subscriber 7a, 7b, . . . , 7n in which, for example, data, process data, or instruction lists are stored.

The processing unit 12 may be configured to process received data and to output data. Data to be processed can be received either from an upstream data bus subscriber or from inputs 13 of the data bus subscriber 7a, 7b, . . . , 7n. In this case, the inputs 13 of the data bus subscriber 7a, 7b, . . . , 7n can be connected to sensors 15, which transmit, for example, measurement data, status data, etc. Processed data can be output either to a downstream data bus subscriber or at outputs 14 of the data bus subscriber 7a, 7b, . . . , 7n. The outputs 14 of the data bus subscriber 7a, 7b, . . . , 7n can be connected to actuators 16, which, for example, perform a particular action by means of the data addressed to them. If processing of the data is also to take place in the uplink direction, data can also be received by a downstream data bus subscriber 7a, 7b, . . . , 7n and processed data can be transmitted to an upstream data bus subscriber 7a, 7b, . . . , 7n.

For the sake of simplicity, in the exemplary embodiment shown here, the data bus subscribers 7a, 7b, . . . , 7n are shown with only one input 13 and one output 14, and only data bus subscriber 7b is connected to sensor 15 and actuator 16. However, it is clear to the person skilled in the art that the data bus subscribers 7a, 7b, . . . , 7n may comprise a plurality of inputs and outputs 13 and 14 and can be connected to a plurality of different sensors 15 and actuators 16, In this case, the feature characterizing the sensors 15 is that the sensors 15 receive data or signals and transmit these to the data bus subscriber 7a, 7b, . . . , 7n, whereas actuators 16 receive data or signals from the data bus subscribers 7a, 7b, . . . , 7n and perform an action based on these data or signals.

Alternatively, the interfaces 8, 9, 10 and 11 can be integrated in one modular unit and the data bus subscribers 7a, 7b, . . . , 7n can be plugged onto this modular unit. The modular units can also be referred to as basic elements of the ring bus 6. The ring bus infrastructure is constructed by the modular units and the data bus subscribers 7a, 7b, . . . , 7n are interchangeable, so that the ring bus 6 can be constructed with any data bus subscriber 7a, 7b, . . . , 7n. With the help of the modular units, it is also ensured that even if a data bus subscriber 7a. 7b, . . . , 7n is removed, the communication between the remaining data bus subscribers 7a, 7b, . . . , 7n is not interrupted because communication takes place via the remaining modular units.

The data bus subscribers 7a, 7b, ..., 7n shown in this embodiment are also often referred to as I/O modules on account of their inputs and outputs 13, 14 that can be connected to sensors 15 or actuators 16. Even if the data bus subscribers 7a, 7b, ..., 7n shown here in the exemplary embodiment are presented as spatially separated from the sensors 15 or actuators 16, the sensors 15 or actuators 16 can also be integrated in the I/O module.

The ring bus 6 shown in the embodiment shown here is based on a cycle frame communication. Here, the local bus master 3 generates, for example, telegrams/data packets in a cycle frame which have a header, a process data part or an information data part and a checksum part. The one or more cycle frames are sent from the local bus master 3 in the downlink direction to the first data bus subscriber 7a of the ring bus 6. The latter receives a first part of the cycle frame via the interface 8. Such a part of the cycle frame is also referred to below as a piece or unit or symbol. The data bus subscriber 7a then carries out a processing of the part, and then forwards the part to the next data bus subscriber 7b via interface 9; preferably simultaneously, the first data bus subscriber 7a receives a second part of the cycle frame, etc. The size of the parts of the cycle frame, i.e., the split of the cycle frame, depends on the capacity of the data bus subscribers 7a, 7b, ..., 7n. For example, at the same time, a fixed number of bits, for example 8 bits of the cycle frame, can be present at the data bus subscriber 7a, 7b, ..., 7n for processing.

The cycle frame accordingly passes unit-by-unit, piecewise, or in parts, for example in parts or symbols of 8 bits through the data bus subscribers 7a, 7b, ..., 7n and the termination unit 17x shown here. The part of the cycle frame which has been processed by the last data bus subscriber, data bus subscriber 7n in the embodiment shown here, is routed from the termination unit 17x from the interface 9 of the data bus subscriber 7n to its interface 10, so that this part of the cycle frame can again pass through the ring bus 6 in the uplink direction, i.e. in the direction of the local bus master 3. In the process, all parts of the cycle frame again pass through the respective data bus subscribers 7y, 7b, ..., 7n of the ring bus 6. Alternatively, the parts of the cycle frame can also be routed past all data bus subscribers 7a, 7b, ..., 7n to the local bus master 3 with the aid of a bypass line.

If the parts of the cycle frame are again routed in the uplink direction through all data bus subscribers 7a, 7b, ..., 7n, they can be re-processed by the data bus subscribers 7a, 7b, ..., 7n so that the cycle frame can be processed twice, once in the downlink direction to the last data bus subscriber 7n and once in the uplink direction to the local bus master 3. For example, processing may take place upstream by means of a signal refresh and/or phase shift.

In the processing of the cycle frame in the downlink direction, i.e., away from the local bus master 3, or in the uplink direction, i.e., towards the local bus master 3, the processing is accomplished by means of instruction lists, wherein the instruction lists contain sets of instructions which can be executed by the processing unit 12 of the data bus subscribers 7a, 7b, ..., 7n. The instruction lists themselves can be sent to the individual data bus subscribers 7a, 7b, ..., 7n in an initialization phase by the local bus master 3 or, advantageously, to the data bus subscribers 7a, 7b, ..., 7n during the ongoing communication, so that programming of the data bus subscribers 7a, 7b, ..., 7n takes place without interrupting the communication.

Which of the instruction lists the data bus subscribers 7a, 7b, ..., 7n should use can be indicated to the data bus subscribers 7a, 7b, ..., 7n on the basis of an instruction list index. This instruction list index informs the data bus subscribers which stored instruction list to use. An instruction list index is thus assigned to an instruction list or vice versa, so that the instruction list to be used can be identified with the aid of the instruction list index. For this purpose, the instruction list index preferably has a value which is assigned to an instruction list, for example, the value indicates a specific instruction list or its memory location. For this purpose, the value itself may be the memory address where the instruction list is stored or where at least a first instruction of the instruction list is stored. Alternatively, or additionally, the value can also indicate a memory area in which the corresponding instruction list is stored. The aforementioned cases can also be referred to as a direct assignment. The value of the instruction list index, however, can also be used, for example, as input of a look-up table (LUT). In this case, the value of the instruction list index is the input value of the conversion table. The output value of the conversion table can be the memory address of the first instruction in the associated instruction list or can otherwise identify the instruction list. The conversion table can be stored in terms of software technology or hardware in the form of, for example, logics and can indicate a one-to-one conversion from an input value to an output value, wherein the output value gives an indication of the instruction list to be used. It depends on the conversion table as to how a relationship between the instruction list index and the instruction list is established. When using a conversion table, it is also possible to speak of an indirect assignment. However, in both the direct and indirect assignment, the instruction list to be used, i.e., found, by the data bus subscriber is uniquely identifiable via the instruction list index. The instruction list index can be added to the cycle frames prior to processing the process data so that the data bus subscribers 7a, 7b, ..., 7n can use the corresponding instruction list according to the order of the process data in the cycle frame. The instruction lists contain instructions that are adapted to the order of the process data in the cycle frame. In this case, the instruction lists can, for example, have a "SKIP" instruction for process data which is not addressed to the data bus subscribers 7a, 7b, ..., 7n, i.e., instruct the data bus subscriber 7a, 7b, ..., 7n to skip the corresponding part of the cycle frame, whereas the instruction list for process data directed to the data bus subscriber 7a, 7b, ..., 7n may have corresponding instructions for processing the process data. The processing of the process data can thus be decoupled from the actual position of the process data in the cycle frame, since the data bus subscribers are adapted to the order of the process data in the cycle frame with the aid of the instruction lists.

As already described above, the embodiment of FIG. 1 shows the termination unit 17x which is connected to data bus subscriber 7n. The termination unit 17x connects the interfaces 9 and 10 of the data bus subscriber 7n, so that the downlinked cycle frame is again sent in reverse order to the local bus master 3, i.e., in the uplink direction, by all data bus subscribers 7a, 7b, ..., 7n. The cycle frame or the parts of the cycle frame can be re-processed by the data bus subscribers 7a, 7b, ..., 7n in the uplink direction or can be looped through the data bus subscribers 7a, 7b, ..., 7n without further processing. The termination unit 17x further provides a status signal at its status signal output 18, which has a previously defined status signal value. This status signal or the status signal value of the termination unit 17x is received at the data bus subscriber 7n at its status signal input 20n. If the data bus subscriber 7n is ready to communicate, i.e., if the data bus subscriber 7n is clock-synchronized with the local bus 6 and the processing unit 12n is capable of processing parts of the cycle frame, then the data bus subscriber 7n changes its status signal value at its status signal output 21n to a status signal value indicating the communication readiness. In this case, the status signal value may, for example, assume a low state before the communication readiness and assume a high state after the communication readiness has been established. The status signal value can therefore be set from a logical zero to a logical one. However, the person skilled in the art is aware that other states or status signal values can also be defined which indicate the readiness to communicate. It is only important that there is a change in the status signal value at the status signal output when communication readiness has been established. As an alternative to the termination unit 17x shown here, the data bus subscriber 7n itself can also assume the functionality of the termination unit 17x. That is, if the data bus subscriber 7n determines that it is the last data bus subscriber of the local bus 6 and determines that no termination unit 17x is connected, then the data bus subscriber 7n itself can again send the parts of the cycle frame received from the downlink direction in the uplink direction. The data bus subscriber 7n can accordingly be adapted in order to establish a connection between the interface 9 and the interface 10. Furthermore, in this case, the data bus subscriber 7n can be adapted to perform a status signal value change at its status signal output 21n after establishing its readiness for communication, even if no status signal value is present at its status signal input 20n.

With the change of the status signal value at the status signal output 21n, a status signal value is present at data bus subscriber 7b at its status signal input 20b, which indicates that the data bus subscriber 7n is ready to communicate. Because this status signal value is the same status signal value output by the termination unit 17x, if this is present, it can also be said that the status signal is routed through the data bus subscriber 7n when it is ready to communicate. Accordingly, the status signal is also routed through the other data bus subscribers 7a, 7b when these are ready to communicate. If all the data bus subscribers 7a, 7b, ..., 7n are ready to communicate, then it can be said that a status signal line exists between the termination unit 17x with its status signal output 18 and the local bus master 3 with its status signal input 5c. This status signal line may physically be a line which, by means of switches or couplers, establishes an electrical or optical connection between the status signal output 18 and the status signal input 5c. This status signal line can pass the signal originating from the status signal output 18 to the status signal input 5c. As already described above, this signal line can also represent only a connection between the status signal output 21n of the last data bus subscriber 7n and the status signal input 5c, namely in the case in which no termination unit 17x is present. As an alternative to establishing a physical connection, the signal line can also only exist on an organizational level and each data bus subscriber 7a, 7b, ..., 7n acts as a repeater of the status signal value signal present at its status signal input 20a, 20b, ..., 20n and generates the same status signal value at its status signal output 21a, 21b, ..., 21n when the data bus subscriber 7a, 7b, ..., 7n is ready to communicate and the status signal value at the status signal input 20a, 20b, ..., 20n indicates that the downstream data bus subscribers are also ready to communicate. In this case, it is also possible to speak of a status signal line, because in this case too, the status signal value of the status signal output 18 of the termination unit 17x or the status signal value of the status signal output 21n of the last data bus subscriber 7n is forwarded to the status signal input 5c of the local bus master 3, even if there is no direct physical connection between the status signal output 18 of the termination unit 17x or the status signal output 21n of the data bus subscriber 7n and the status signal input 5c of the local bus master 3. In the case of a solely organizational status signal line, it can also be said that there is only one physical connection between in each case two data bus subscribers 7a, 7b, ..., 7n, but there is no physical connection between all the data bus subscribers 7a, 7b, ..., 7n.

Figure 2:
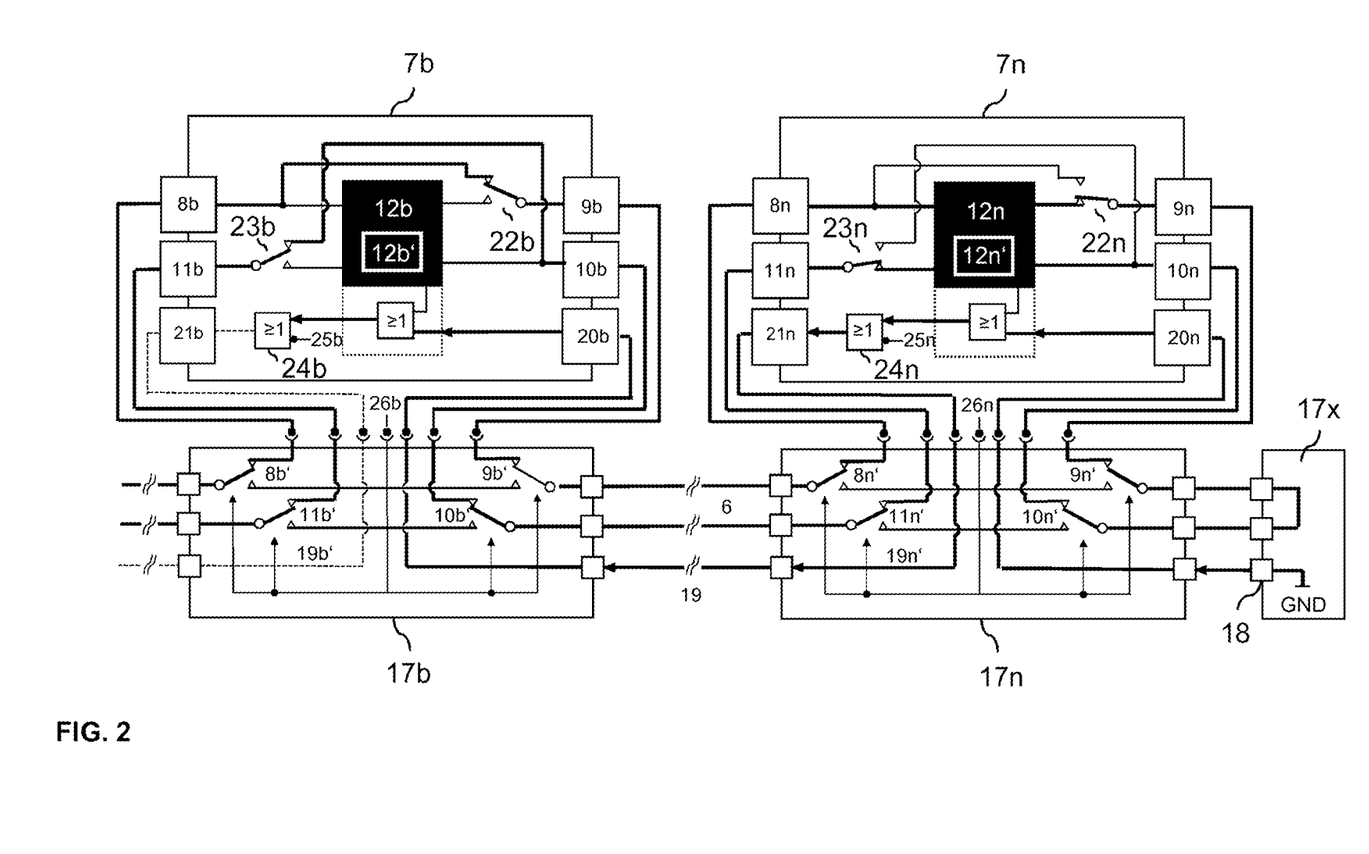
FIG. 2 is a schematic block diagram with at least two exemplary data bus subscribers according to the invention.

Even if the status signal line in the exemplary embodiment shown here is similar to the local bus 6, the status signal line is separate from the local bus 6. That is, the status signal is not propagated via a bus line which is designed to carry data. In FIG. 2, this separation is shown in detail.

FIG. 2 shows a schematic block diagram with two exemplary data bus subscribers 7b and 7n from the local bus 6 corresponding to FIG. 1. The data bus subscribers 7b and 7n are connected in the example shown here to base elements 17b and 17n, which establish the infrastructure for the local bus 6 and the status signal line 19. In other words, the hardware base elements are connected to each other, including a first base element and a second base element, the at least two hardware base elements forming a communication infrastructure for the bus system. The base elements 17b and 17n have switchable connections for the downlink direction and uplink direction of data. For this purpose, for example, the base element 17b contains the switches 8b', 9b', 11b' and 10b'. The switches 8b' and 9b' may either route the downlink direction of data to the data bus subscriber 7b plugged on the base element 17b or may route it through the base element 17b if, for example, no data bus subscriber 7b is present. The uplink direction of data may also be routed with the switches 10b' and 11b' either through the data bus subscriber 7b plugged onto the base element 17b or may be routed through the base element 17b if, for example, no data bus subscriber 7b is present. The designation of the switches is accompanied by the designation of the respective interfaces 8b, 9b, 10b, and 11b on the data bus subscriber 7b. Thus, the switch 8b' of the base element 17b switches the data in the downlink direction on the interface 8b; the switch 9b' switches the data coming from the interface 9b of the data bus subscriber 7b to the downstream base element 17n. The switch 10b' switches the data coming in the uplink direction from the base element 17n to the interface 10b of the data bus subscriber 17b, and the switch lib' switches the data coming from the interface 11b of the data bus subscriber 17b to the upstream base element 17a here. The switches 8b', 9b', 10b', and 11b' can be switched via a signal input at the input 26b. This signal input may be a mechanical, electrical or optical signal input. For example, the switches 8b', 9b', 10b', and 11b' may switch when a mechanical connection is made between the base element 7b and the data bus subscriber 7b. However, it is also conceivable that the switches 8b', 9b', 10b', and 11b' only switch when there is an electrical or optical signal input generated by the data bus subscriber 7a. In the embodiment shown here, the base elements 17b and 17n are respectively connected to the data bus subscribers 7b and 7n. In this case, the switches 8b', 9b', 10b', 11b' and 8n', 9n', 10n', 11n' are switched such that the downlink direction and uplink direction of the data are each routed in such a way that these are routed to the respective interfaces 8b, 9b, 10b, 11b and 8n, 9n, 10n, 11n of the data bus subscribers 7b and 7n.

Further, the data bus subscribers 7b and 7n themselves have switches 22b, 23b and 22n, 23n. With the help of these switches 22*b*, 23*b* and 22*n*, 23*n*, data can bypass the respective processing units 12*b* and 12*n* in the downlink and in the uplink direction, for example, if these are not yet able to process the corresponding data.

In the embodiment shown here, the processing unit 12*n* of the data bus subscriber 7*n* is already able to process data, whereas the processing unit 12*b* of the data bus subscriber 7*b* is not yet able to process data.

In the data bus subscriber 7*n*, the switch 22*n* is switched such that it connects the interface 8*n* to the processing unit 12*n* instead of connecting the interface 8*n* directly to the interface 9*n*, such that data can be processed in the downlink direction by the processing unit 12*n*. In the uplink direction, the switch 23*n* is connected such that this connects the interface 10*n* with the processing unit 12*n* instead of directly connecting the interface 10*n* with the interface 11*n*, such that data can be processed in the uplink direction by the processing unit 12*n*.

In the embodiment shown here, the processing unit 12*b* of the data bus subscriber 7*b* is not yet able to process data. Accordingly, the switches 22*b* and 23*b* are switched such that the data bypasses the processing unit 12*b*. In the embodiment shown here, this is done by the interface 8*b* being connected directly to the interface 9*b* and the interface 10*b* being connected directly to the interface 11*b*. As soon as the processing unit 12*b* is able to process data, the switches 22*b* and 23*b* are switched and are switched to the switching state corresponding to the data bus subscriber 7*n*, so that data can be processed by the processing unit 12*b*.

The person skilled in the art is aware that even if a re-processing of the data is shown here in the uplink direction and the latter are routed through the processing units 12*b* and 12*n*, provided these are ready, this does not have to be the case. If no further processing is to take place in the uplink direction, then the switches 23*b* and 23*n* can always be switched in such a way that the interfaces 10*b* and 11*b* or 10*n* and 11*n* are connected to one another. It is also conceivable that in this case the switches 23*b* and 23*n* are omitted and that a non-switchable connection exists between the interfaces 10*b* and 11*b* or 10*n* and 11*n*. It is also conceivable that in this case the switches 10*b*', 11*b*' and 10*n*', 11*n*' of the base elements 17*b* and 17*n* are omitted and that the uplink direction is routed directly through the base elements.

Furthermore, the base elements 17*b* and 17*n* include a part of the signal line 19, namely sections 19*b*' and 19*n*'. The signal line starts at the termination unit 17*x*. The termination unit 17*x* applies a status signal value to its status signal output 18, status signal value GND in the exemplary embodiment shown here; the latter is routed via the base element 17*n* to the status signal input 20*n* of the data bus subscriber 7*n*. Since the data bus subscriber 7*n* is already ready to communicate, i.e., it is clock-synchronized to the data on the local bus 6 and the processing unit 12*n* is able to receive and process data such that the switches 22*n* and 23*n* no longer provide a bridging of the processing unit 12*n*, the status signal value coming from the status signal input 20*n* is linked with a discrete value 25*n* at the logical link unit 24*n*. This discrete value 25*n* is generated or set to a specific value by the processing unit 12*n* as soon as the processing unit 12*n* is ready to communicate. The logical link unit 24*n* is adapted to establish a logical linkage of the status signal value of the status signal input 20*n* and the discrete value 25*n*. In this case, the linkage is accomplished such that only when the status signal value of the status signal input 20*n* indicates that the downstream data bus subscribers are ready to communicate—specified here by the termination unit 17*x*—and the discrete value 25*n* indicates that the processing unit 12*n* is ready for communication, then the status signal value of the status signal output 21*n* of the data bus subscriber 7*n* is set to the same status signal value as the status signal value of the status signal input 20*n* of the data bus subscriber 7*n*. This status signal value applied to the status signal output 21*n* of the data bus subscriber 7*n* is then forwarded to the upstream data bus subscriber 7*b* via the base elements 17*n* and 17*b*.

In the exemplary embodiment shown here, the data bus subscriber 7*b* receives the status signal value of the status signal output 21*n* of the data bus subscriber 7*n* at its status signal input 20*b*. However, since the processing unit 12*b* of the data bus subscriber 7*b* is not yet ready to communicate, and this is still bypassed by means of the switches 22*b* and 23*b*, the discrete value 25*b* is not yet set to a value indicative of communication readiness. That is to say, the logical link unit 24*b* still outputs a status signal value at the status signal output 21*b* of the data bus subscriber 7*b* indicating that the data bus subscriber 7*b* or its processing unit 12*b* is not yet ready to communicate. That is, a status signal value is output which differs from the status signal value received at the status signal input 20*b* of the data bus subscriber 7*b*. Only when the data bus subscriber 7*b* or its processing unit 12*b* is ready for communication is the discrete value 25*b* set to a value which causes the logical link unit 24*b* to output a status signal value at the status signal output 21*b* of the data bus subscriber 7*b*, which corresponds to the status signal value of the status signal input 20*b* of the data bus subscriber 7*b*. That is to say only when all the data bus subscribers 7*a*, 7*b*, . . . , 7*n* are ready to communicate is the same status signal value received via the status signal input 5*c* of the local bus master 3 which was generated by the termination unit 17*x* or the last data bus subscriber 7*n*. The local bus master 3 is then aware that the local bus 6 is complete and that all data bus subscribers 7*a*, 7*b*, . . . , 7*n* are ready to communicate. The local bus master 3 can then send telegrams/data packets to the local bus 6, which serve to identify the respective connected data bus subscribers. Already during the initialization of the local bus 6, i.e., before the local bus master 3 detects a change to the status signal input 5*c*, can the local bus master 3 send such telegrams/data packets to the local bus 6 because the data bus subscribers 7*a*, 7*b*, . . . , 7*n* successively become ready to communicate. Since the data bus subscribers 7*a*, 7*b*, . . . , 7*n* not yet ready to communicate are bypassed, the others can already communicate with the local bus master 3 to exchange identity information. If the status signal value changes at the status signal input 5*c* of the local bus master 3, however, the latter has knowledge that the local bus 6 is complete and can send the corresponding telegrams/data packets one last time in order to identify the not-yet-identified data bus subscribers 7*a*, 7*b*, . . . , 7*n*.

If no data bus subscriber 7*a*, 7*b*, . . . , 7*n* is arranged on one of the base elements 17*a*, . . . , 17*n*, a cap can be arranged on the latter, which bridges the signal line 19 for this base element 17*a*, . . . , 17*n*, i.e., establishes a conductive connection. Otherwise, in a not fully occupied local bus 6, it would never be displayed that all data bus subscribers 17*a*, . . . , 17*n* are ready to communicate. Instead of a cap, the base elements 17*a*, 17*n* can also be designed to independently provide a bridging of the signal line 19 if no data bus subscriber 7*a*, 7*b*, . . . , 7*n* is present. For this purpose, the base elements 17*a*, . . . , 17*n* recognize the presence of a data bus subscriber 7*a*, 7*b*, . . . , 7*n* and switches the bridging accordingly. The bridging can be switched mechanically or electrically. For example, when plugging the data bus subscriber 7a, 7b, ..., 7n, the latter can activate a mechanism in or at the respective base element 17a, ..., 17n with a geometry arranged on data bus subscriber 7a, 7b, ..., 7n, such that the bridging is canceled and the signal line 19 is routed through the data bus subscriber 7a, 7b, ..., 7n.

Figure 3:
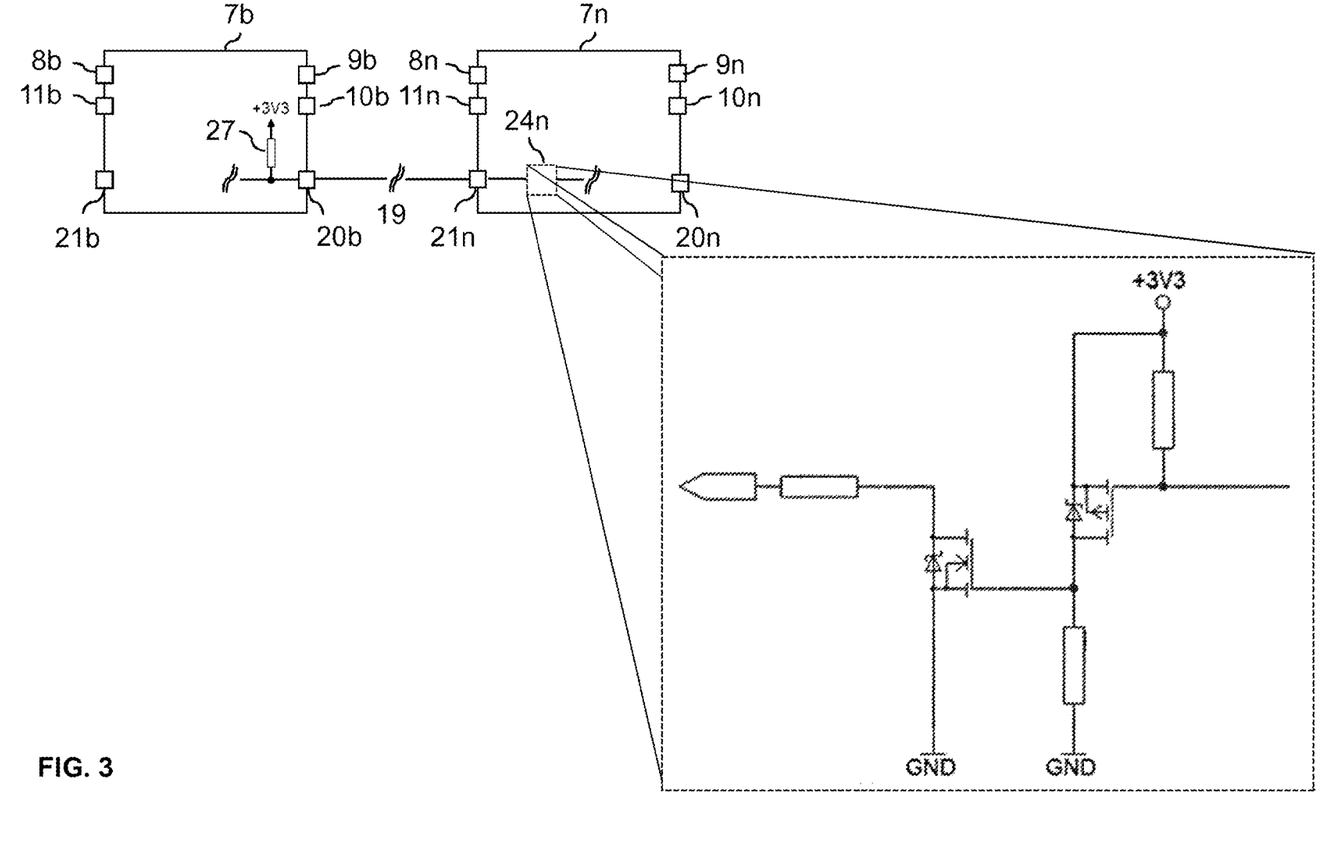
FIG. 3 is a schematic block diagram of the at least two exemplary data bus subscribers as shown in FIG. 2 with a pull-up resistor at the status signal input and a controller at the status signal input.

FIG. 3 shows a schematic block diagram of the two exemplary data bus subscribers 7b and 7n as shown in FIG. 2. In this case, the data bus subscriber 7b has a pull-up resistor 27 at its status signal input 20b. This ensures that when the status signal output 21n of the data bus subscriber 7n is of high impedance, a logical one is applied to the status signal input 20b. Only when changing the resistance value at the status signal output 21n can the logic state change, namely to the state which is provided at the status signal output 21n of the data bus subscriber 7n. This provided state corresponds to the status signal of the data bus subscriber 7n or its status signal value. If the data bus subscriber 7n is ready to communicate, then it provides a status signal at its status signal output 21n, which indicates that the data bus subscriber 7n is ready to communicate. In this case, the data bus subscriber 7n changes the resistance value of the status signal output 21n. If this was initially of high impedance as compared to the pull-up resistor 27 and is changed to low impedance, then the logic state given by the pull-up resistor is no longer present at the status signal input 20b, but instead the logic state of the status signal of the status signal output 21n. For example, at a first resistance value of the status signal output 21n, the pull-up resistor 27 can ensure that the status signal input 20b has a logical state of one, whereas the status signal has a logical zero. However, since the resistance value of the status signal output 21n is of even higher impedance than the resistance of the pull-up resistor 27, the status signal is not received at the status signal input 20b. Only when the resistance value of the status signal output 21n changes to low impedance as compared to the pull-up resistor 27 is the status signal received at the status signal input 20b and does the logic state change from one to zero. In the embodiment shown here, the resistance change is provided by means of two separate MOSFETs, as can be seen in the magnification. These each connect either a high or low resistance to the status signal output 21n, wherein the resistance values are adapted to the pull-up resistor 27. However, it is well known to the person skilled in the art that there are other possibilities to make a corresponding change in resistance. The change in resistance ensures that there are no undefined states at the status signal inputs at any time. This is particularly important in the chain-based forwarding of the status signal because an error on one data bus subscriber in the chain could cause the upstream data bus subscribers to provide a false status signal value at their status signal outputs.

Figure 4:
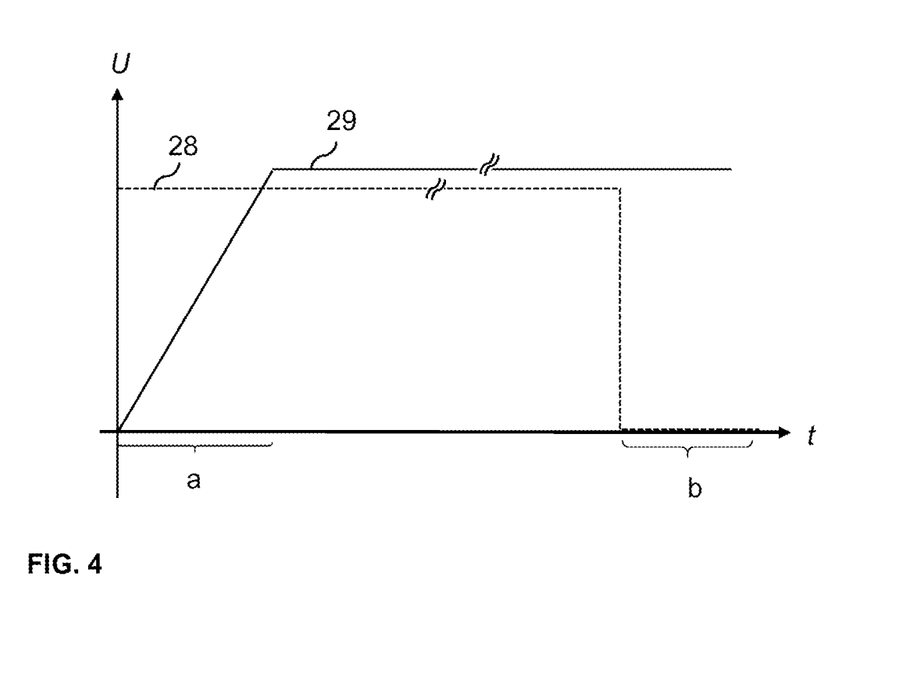
FIG. 4 is a schematic voltage diagram of an exemplary data bus subscriber.

FIG. 4 shows a schematic voltage diagram of two data bus subscribers 7b and 7n. In this case, the curve 28 shows the voltage characteristic at the status signal input 20b of the data bus subscriber 7b, while the curve 29 shows the supply voltage characteristic of the data bus subscriber 7n. When the supply voltage of the data bus subscriber 7n is switched on, an increase is initially evident over a certain time—see section a—until the supply voltage has assumed the value for normal operation. During this time, the voltage of the status signal input 20b is held in the logical state one by the pull-up resistor 27. This is due to the fact that the data bus subscriber 7n has not yet changed the resistance value of its status signal output 21n at this time. Without this maintenance of the resistance value, the voltage of the status signal input 20b would already assume an undesired state when the supply voltage increases. However, the maintenance of the resistance value of the status signal output 21n ensures that the logical state of the status signal input 20b remains constant. Only when the data bus subscriber 7n is ready to communicate is there a change in resistance of the status signal output 21n of the data bus subscriber 7n, which leads to a change in the voltage at the status signal input 20b of the data bus subscriber 7b, i.e., to a change in the logical state—see section b. In this way, a status signal can be conditionally forward from one data bus subscriber 7a, 7b, ..., 7n to the other without causing undesirable states.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bus system, the bus system comprising:
at least two data bus subscribers, including a first data bus subscriber and a second data bus subscriber;
at least two hardware base elements connected to each other, including a first base element and a second base element, the at least two hardware base elements forming a communication infrastructure for the bus system;
at least two processors, including a first processor in the first data bus subscriber and a second processor in the second data bus subscriber;
at least two switches, the at least two switches controlling bus communication to the at least two processors and controlling a bypass of one or more of the at least two data bus subscribers,
wherein each of the at least two data bus subscribers are configured to connect to a respective hardware base element of the at least two hardware base elements,
wherein the at least two switches are disposed in the at least two hardware base elements,
wherein the first data bus subscriber is physically connected to the first base element and the second data bus subscriber is physically connected to the second base element,
wherein the first base element and the second base element are electrically connected such that the first data bus subscriber and the second data bus subscriber are adapted to communicate via the first base element and the second base element, and
wherein the communication infrastructure between the at least two hardware base elements including the first base element and the second base element includes an uplink and a downlink.

2. The bus system according to claim 1, wherein the first data bus subscriber or the second data bus subscriber is configured to indicate a readiness to communicate via a status signal,
wherein the first data bus subscriber is ready to communicate as soon as the first data bus subscriber is clock-synchronized on the bus system.

3. The bus system according to claim 2, wherein the first data bus subscriber includes a logical linkage configured to set the status signal to a fixed state if the first data bus subscriber is not ready to communicate.

4. The bus system according to claim 1, wherein the bypass is configured for routing telegrams past the first processor of the first data bus subscriber as long as the first processor cannot process the telegrams.

5. The bus system according to claim 1, wherein the bypass is configured to route data past the first processor of the first data bus subscriber as long as the first data bus subscriber is not ready to communicate or as long as the first processor is not initialized to carry out processing.

6. The bus system according to claim 1, wherein the first data bus subscriber and the second data bus subscriber each have a first interface and a second interface forming the downlink and each have a third interface and a fourth interface forming the uplink.

7. The bus system according to claim 1, wherein the bypass corresponding to the first data bus subscriber or the second data bus subscriber includes an internal switch.

8. The bus system according to claim 1, wherein the first data bus subscriber or the second data bus subscriber is configured to indicate a readiness to communicate via a status signal, the status signal being routed via the first base element or the second base element.

9. The bus system according to claim 1, wherein the bus system is configured as a ring network.

10. The bus system according to claim 1, further comprising:
   a local bus master, the local bus master being connected to the first data bus subscriber and the second data bus subscriber.

11. The bus system according to claim 10, wherein the local bus master is arranged decentrally from the first data bus subscriber and the second data bus subscriber.

12. The bus system according to claim 1, further comprising:
   a DIN rail for connecting at least the first data bus subscriber and the second data bus subscriber of the bus system.

* * * * *